(12) United States Patent
Younie (10) Patent No.: US 11,638,420 B2
(45) Date of Patent: May 2, 2023

(54) MODULAR HUNTING BLIND

(71) Applicant: Brett A. Younie, St. John, KS (US)

(72) Inventor: Brett A. Younie, St. John, KS (US)

( * ) Notice: Subject to any disclaimer, the term of this patent is extended or adjusted under 35 U.S.C. 154(b) by 254 days.

(21) Appl. No.: 17/116,886

(22) Filed: Dec. 9, 2020

(65) Prior Publication Data

US 2021/0169068 A1 Jun. 10, 2021

Related U.S. Application Data

(60) Provisional application No. 62/945,592, filed on Dec. 9, 2019.

(51) Int. Cl.
*A01M 31/02* (2006.01)
*E04H 15/00* (2006.01)

(52) U.S. Cl.
CPC ......... *A01M 31/025* (2013.01); *E04H 15/001* (2013.01)

(58) Field of Classification Search
CPC .................... A01M 31/025; E04H 155/001
See application file for complete search history.

(56) References Cited

U.S. PATENT DOCUMENTS

| | | | |
|---|---|---|---|
| 6,948,280 B2 | 9/2005 | Marcinkowski et al. | |
| 7,325,364 B2 | 2/2008 | Leininger et al. | |
| 8,444,174 B1 * | 5/2013 | Miller, Jr. | E04H 15/001 |
| | | | 182/63.1 |
| 9,909,313 B1 * | 3/2018 | Grubbs | E04H 15/008 |
| 2006/0048459 A1 | 3/2006 | Moore | |
| 2015/0122300 A1 | 5/2015 | Reed | |
| 2015/0159393 A1 | 6/2015 | Gulik | |
| 2020/0391132 A1 * | 12/2020 | McInerney | E04B 1/3445 |

* cited by examiner

*Primary Examiner* — Brady W Frazier
*Assistant Examiner* — Shanna Danielle Glover
(74) *Attorney, Agent, or Firm* — Avek IP, LLC (57) ABSTRACT

A modular hunting blind with individual components configured to be stored in the base with the top and roof serving as a container top to store and ship the modular hunting blind. The components may be readily assembled on site for placement on the ground or on a stand or platform with minimal tools.

11 Claims, 9 Drawing Sheets

MODULAR HUNTING BLIND

CROSS REFERENCE TO RELATED APPLICATION

This application claims the benefit of application Ser. No. 62/945,592, filed Dec. 9, 2019, entitled MODULAR HUNTING BLIND.

FIELD

The present invention relates to hunting blinds and, more particularly, to modular hunting blinds that may be compactly shipped and stored and assembled without tools.

BACKGROUND

Hunting blinds are known in the art. Hunting blinds are used to conceal an individual and equipment in the outdoors to allow the interaction with nature in a natural environment for hunting or photography, for example. Blinds permit for hunting, photographing and observing wildlife in their natural environment and prevent the wildlife from being frightened away from an area of their natural habitat by the presence of individuals.

A problem with these prior art blinds is they are bulky, difficult to ship and store, and difficult to setup on site. There is a need for a modular hunting blind that may be compactly shipped and stored, and is relatively easy to assemble with minimal tools.

SUMMARY

The present invention is a hunting blind that is modular with the individual components configured to be stored in the base, with the top and roof serving as a container top to store and ship the hunting blind. The components may be readily assembled on site for placement on the ground or on a stand or platform with minimal tools.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Referring initially to FIGS. 1-10 and 14-16, a four-sided hunting blind of the present invention is generally indicated to by reference numeral 20 (FIG. 2), and a six-sided hunting blind of the present invention is generally indicated by reference numeral 22. As the features of the two embodiments are generally the same except for the number of sides, reference to the six-sided hunting blind 22 will be made throughout the specification.

Figures 1, 2:
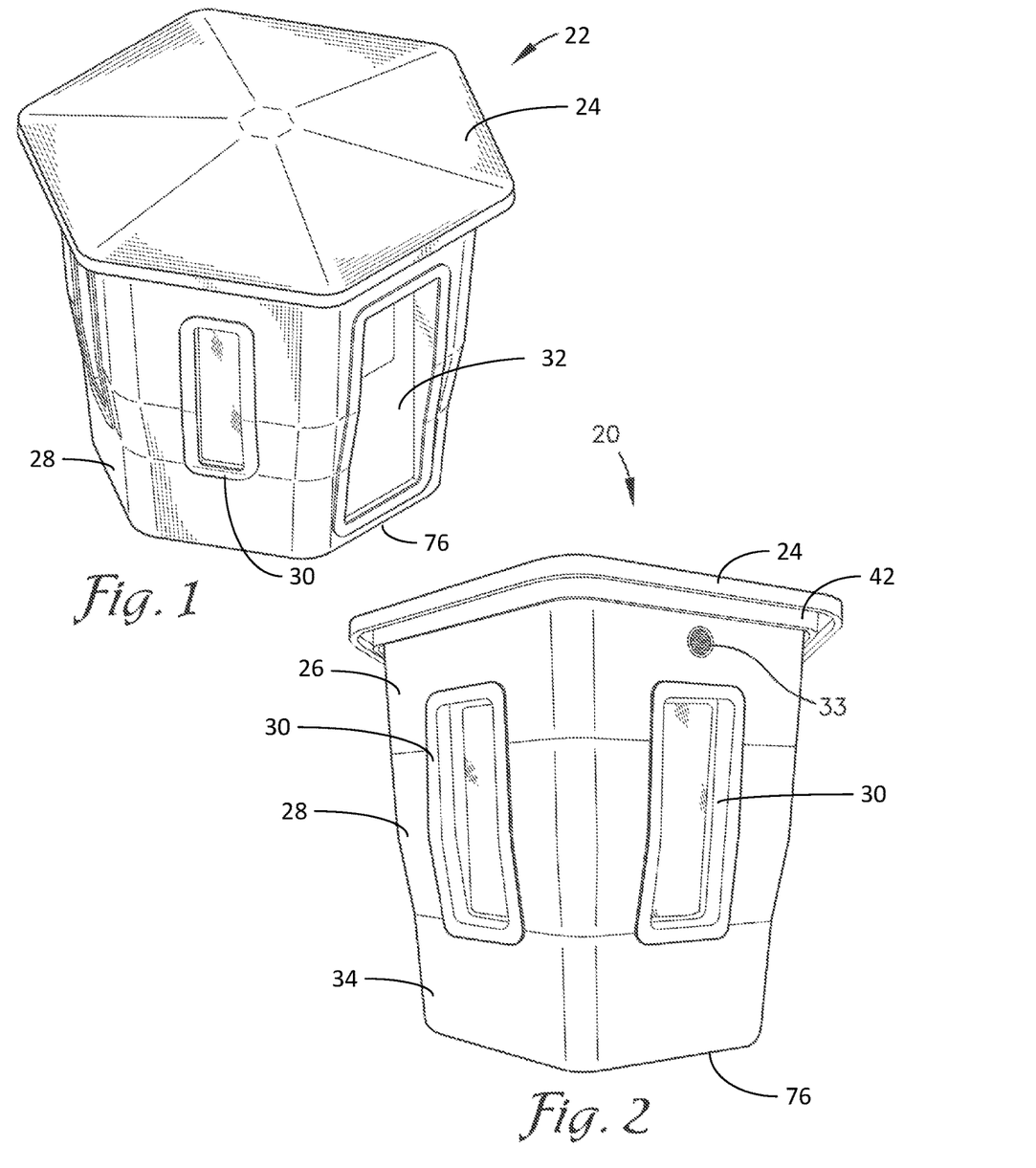
FIG. 1 is front elevational perspective view of a six-sided hunting blind of the present invention.
FIG. 2 is a rear elevational perspective view of a four-sided hunting blind of the present invention.
Figure 3:
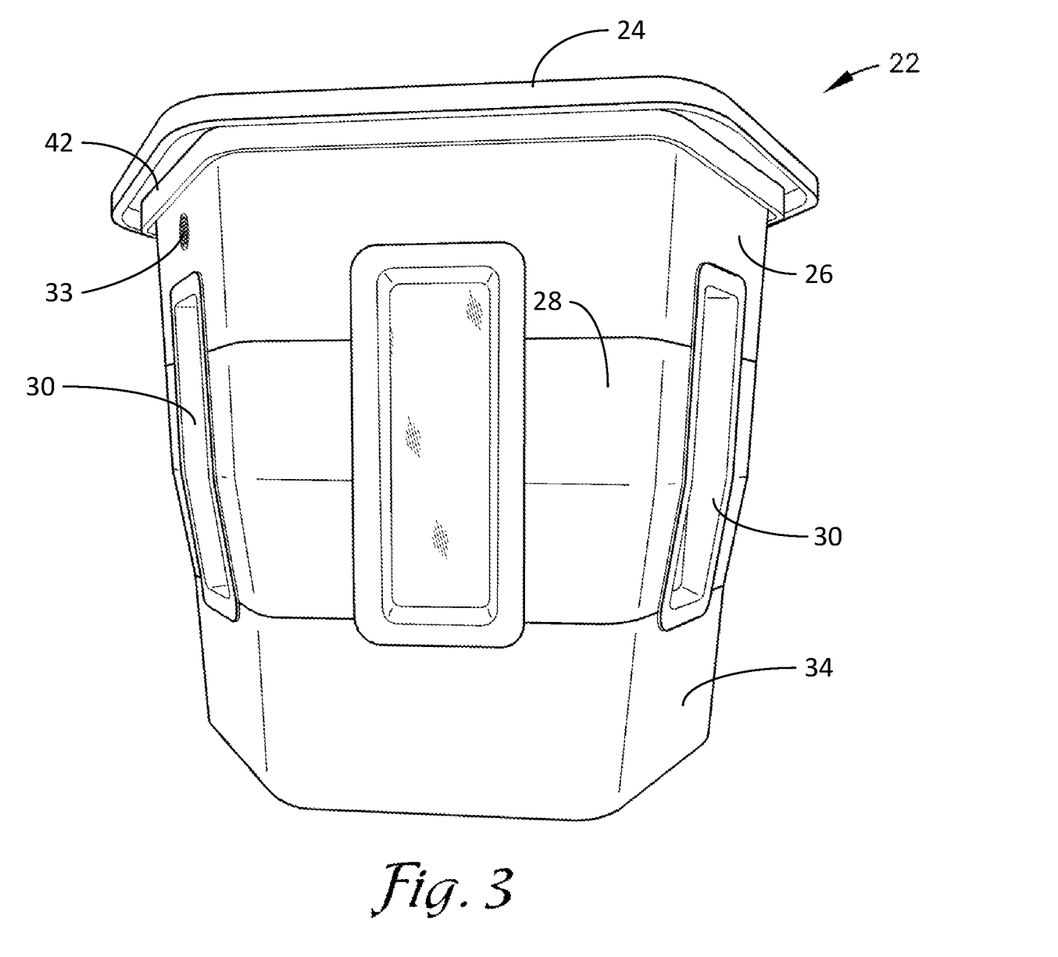
FIG. 3 is a side elevational view of a six-sided of a hunting blind of FIG. 1.
Figure 16:
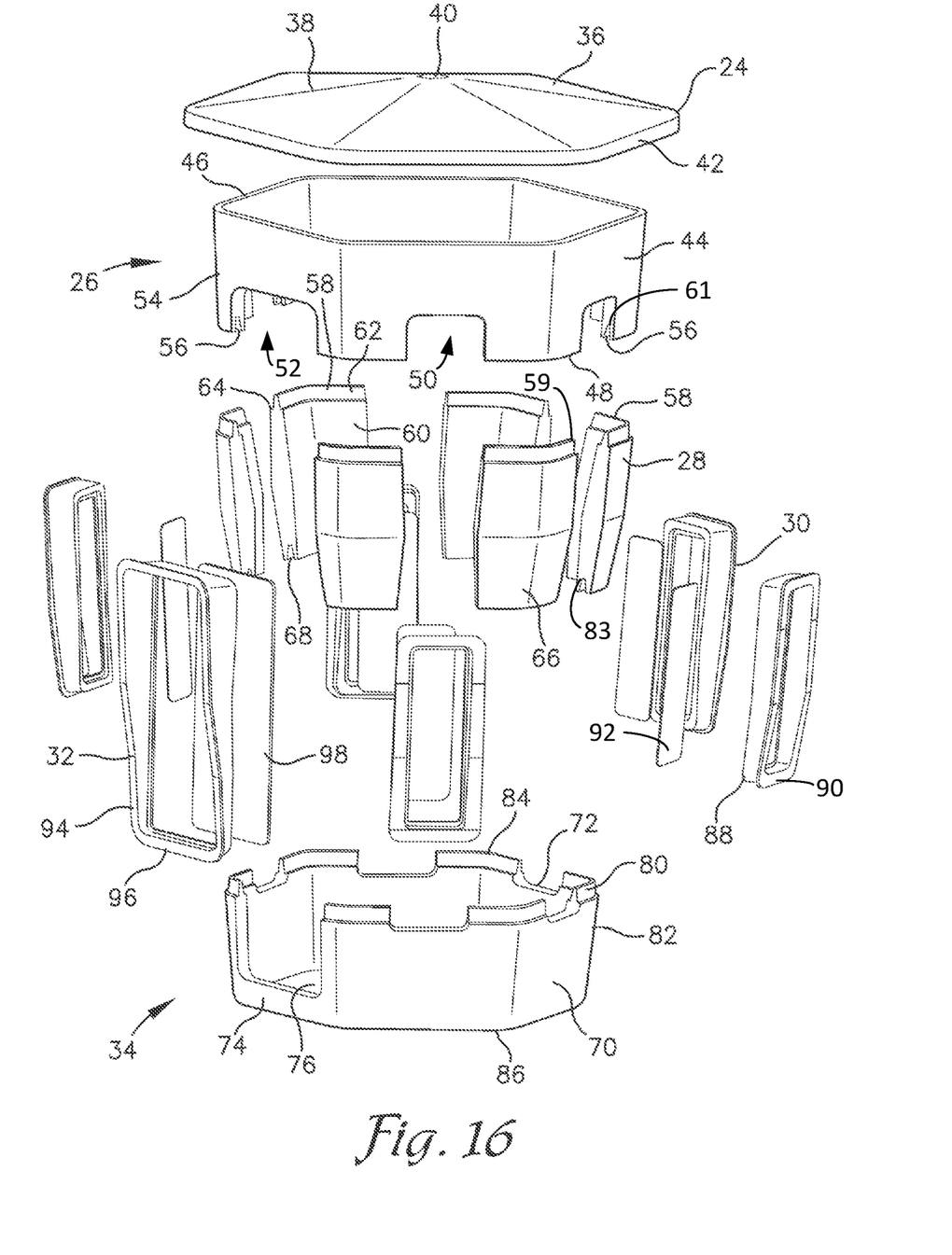
FIG. 16 is an exploded view of the hunting blind of FIG. 1.

Hunting blind 22 includes a roof 24, a top section 26, a plurality of middle sections 28, one or more window assemblies 30, a door assembly 32, and a base 34. The roof 24 is generally a hexagon-shaped, unitary top with six triangular panels 36 separated by ribs 38 extending outwardly from a raised center 40 of the roof 24 to an outer perimeter 42 extending downwardly from the triangular panels 36 to form a lip 43. The slope of the triangular panels 36 allows for runoff of water from the roof 24. The ribs 38 provide strength and rigidity to the roof 24 extending from the raised center 40 to the outer perimeter 42.

The top section 26 is generally a hexagon-shaped, unitary structure with six walls 44 extending downwardly and inwardly from an upper perimeter 46 to a lower perimeter 48. The walls 44 are of a double-wall design to dampen acoustics, reduce odor and provide improved insulation. Each of the walls 44 may include cut-outs 50 and 52 to receive a window assembly 30 or a door assembly 32, respectively. The top section 26 may include one or more vents 33 for ventilation.

The middle sections 28 are generally three-sided matching the corner sidewalls 54 of the top section 26. Each of the corner sidewalls 54 include a slot 56 in its lower perimeter 48 to receive a tab 58 extending from the top 60 of each of the middle sections 28. When the tab 58 is fully inserted or seated in the slot 56, the lower perimeter 48 rests on an inner 62 and outer 64 ledges of the middle section 28 to seal the middle section 28 to the top section 26 to keep out water, bugs and other pests. Tabs 58 may include a boss or protuberance 59, which may be received in a seat or detent 61 in the slots 56, to add strength, facilitate assembly, provide for fastening, and so forth. The lower extent 66 of the middle sections 28 include a slot 68.

Figure 8:
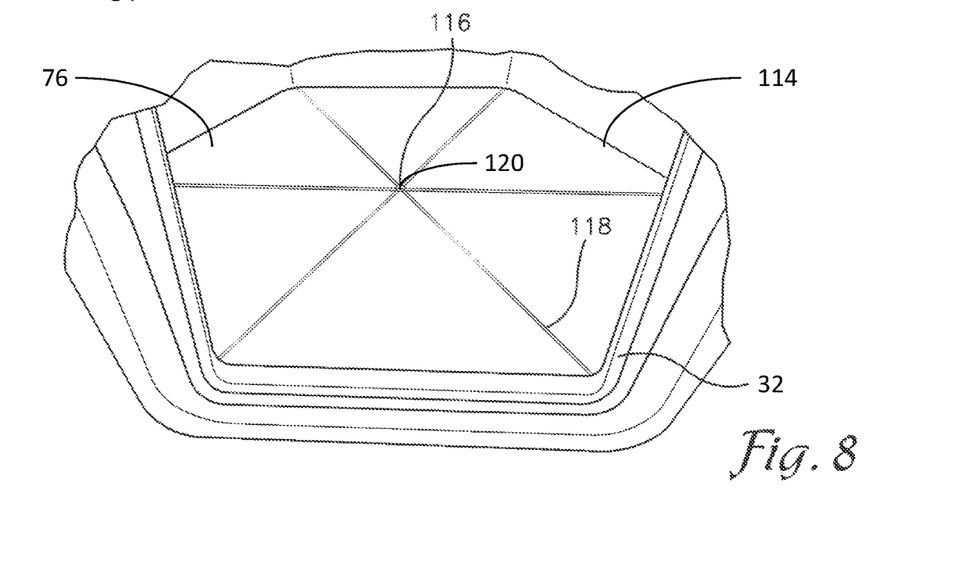
FIG. 8 is a perspective view of the floor of the hunting blind of FIG. 1.
Figure 9:
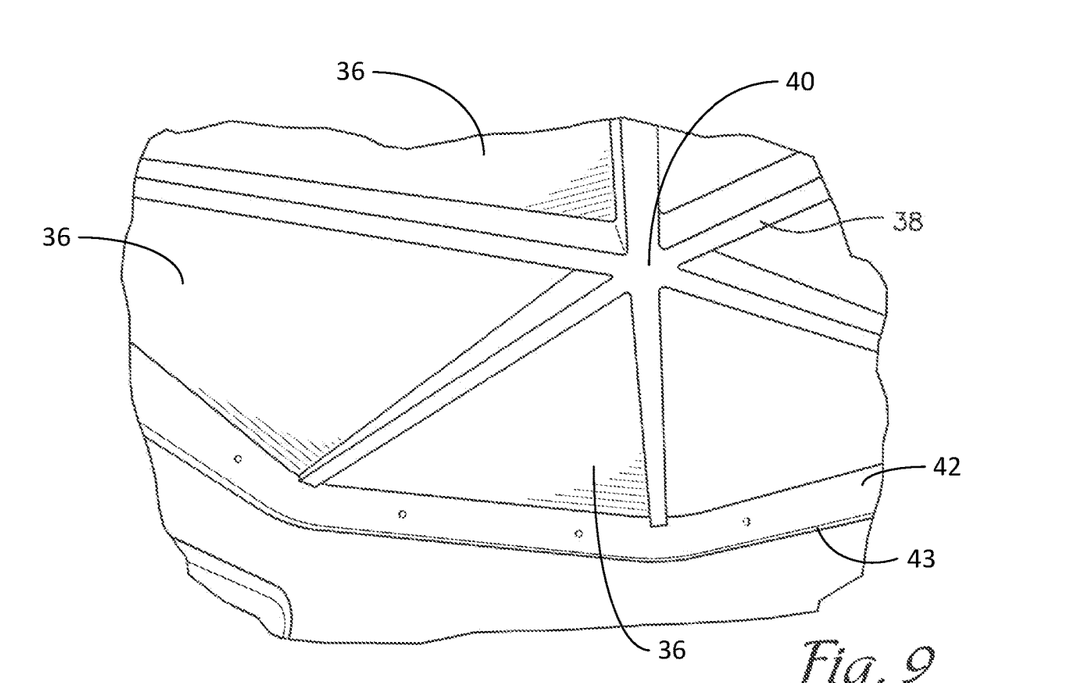
FIG. 9 is a perspective view of the ceiling of the hunting blind of FIG. 1.

The base section 34 includes sidewalls 70 with window notches 72 for receiving the window assemblies 30 and a door notch 74 for receiving the door assembly 32. The base section 34 includes a floor 76 integrally formed with the sidewalls 70. Each of the sidewalls 70 includes tabs 80 extending from the top 82 of the sidewalls 70. The tabs 80 are received in the respective slot 68 of the adjoining middle sections 28. The lower extent 66 of the middle sections 28 rests on inner 84 and outer 86 ledges of the base section 34 sidewalls 70 to seal the middle sections 28 to the base sections 34 sidewalls 70 to keep out water, bugs and other pests. Tabs 80 may include a boss or protuberance 81, which may be received in a seat or detent 83 in the slots 68, to add strength, facilitate assembly, provide for fastening, and so forth.

The roof 24 is secured to the top section 26 with bolts, screws, tabs or other fasteners passing through the outer periphery 42 through the vertical walls 44 of the top section 26. The middle sections 28 may be secured to the top section 26 with bolts, screws, tabs or other fasteners passing through the lower perimeter 48 through the tabs 58 to the interior of the top section 26, or bosses 59 as described above. The base section 34 is secured to the middle section 28 with bolts or other fasteners passing through the lower extent 66 of the middle sections 28 through the tabs 80 of the base section 34 to the interior of the base section 34, or bosses 81 described above.

Figure 6:
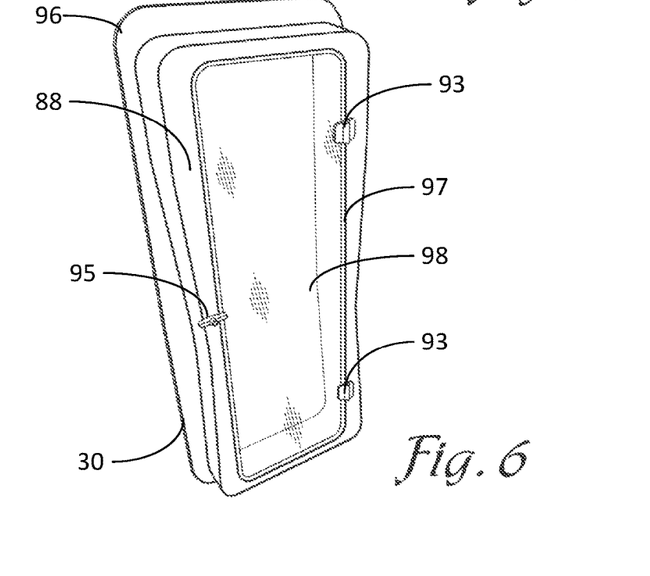
FIG. 6 is an elevational perspective view of a window and jamb of the hunting blind of FIG. 1.

Window assemblies 30 include a jamb 88, an outer flange 90 and a window 92. The jamb 88 fits within the window openings formed by the alignment of cut-outs 50, middle section 28, and window notches 72. The window assemblies 30 may be secured to the middle section 28 and top section 26 with bolts or other fasteners passing through the outer flange 90. The windows 92 may be tinted panels secured to the frame 88 by hinges 93 to enable opening of the windows 92 and include a latch 95 to secure the windows 92. The jamb 88 includes a compression seal 97 around an inside perimeter of the jamb 88 to seal the window 92 when it is closed.

Figure 7:
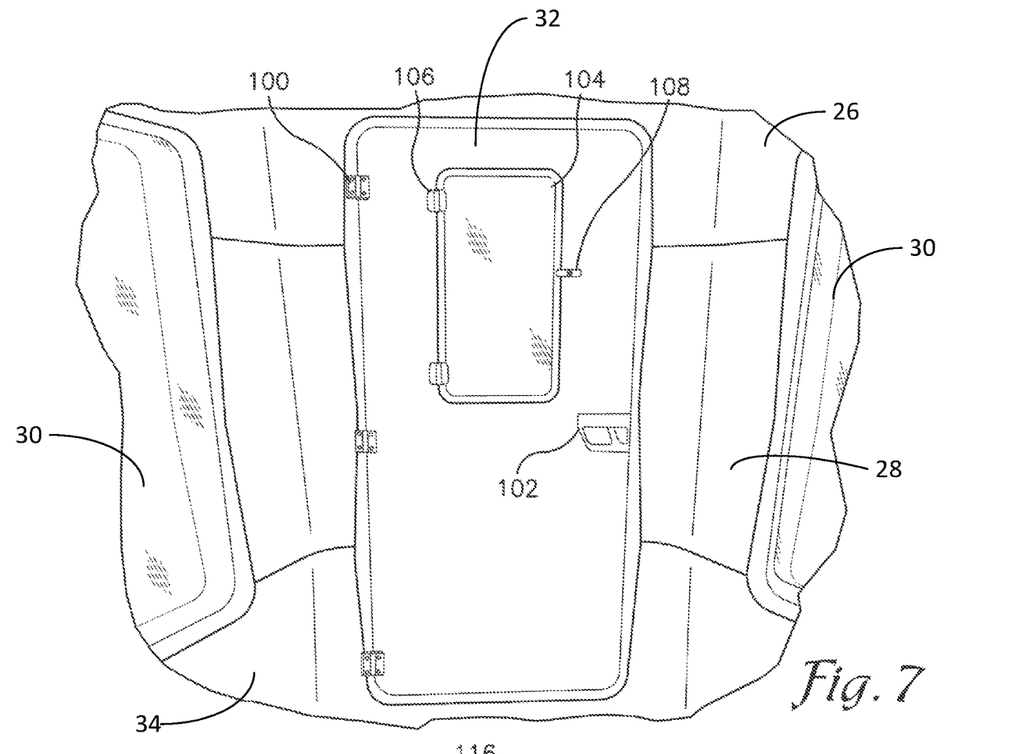
FIG. 7 is an interior view of a door of the hunting blind of FIG. 1.

The door assembly 32 includes a jamb 94, an outer flange 96, and a door 98. The outer flange 96 is bolted or otherwise fastened to the middle sections 28, base section 34 and top section 26. The door 98 is attached to the jamb 94 with hinges 100 and includes a latch 102. Door 98 may include a window 104 which may be fixed or include hinges 106 and a latch 108 so that the window 104 may be opened. A compressible rubber seal 110 is adhered to an inside channel in the door jamb 94, which compresses when the door 98 is closed for a weather tight seal.

Figure 5:
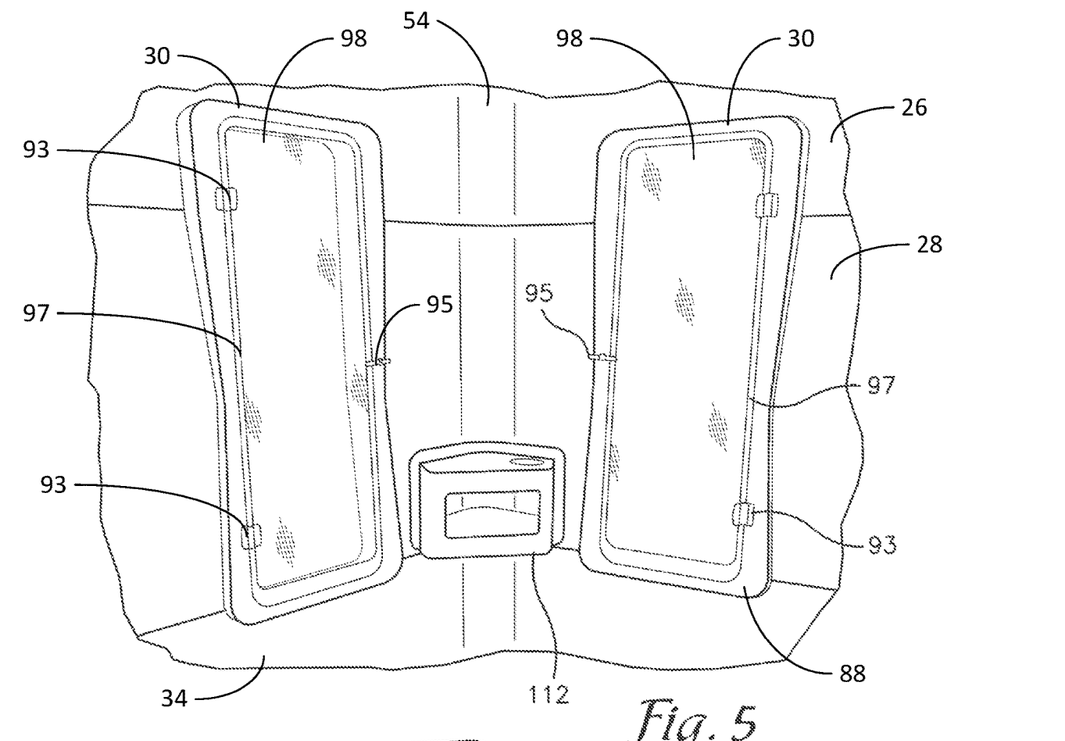
FIG. 5 is an interior view of the hunting blind of FIG. 1.

A cupholder/storage console 112 may be included in the interior of the hunting blind 22 secured to one of the middle sections 28 with screws or other fasteners.

Figure 4:
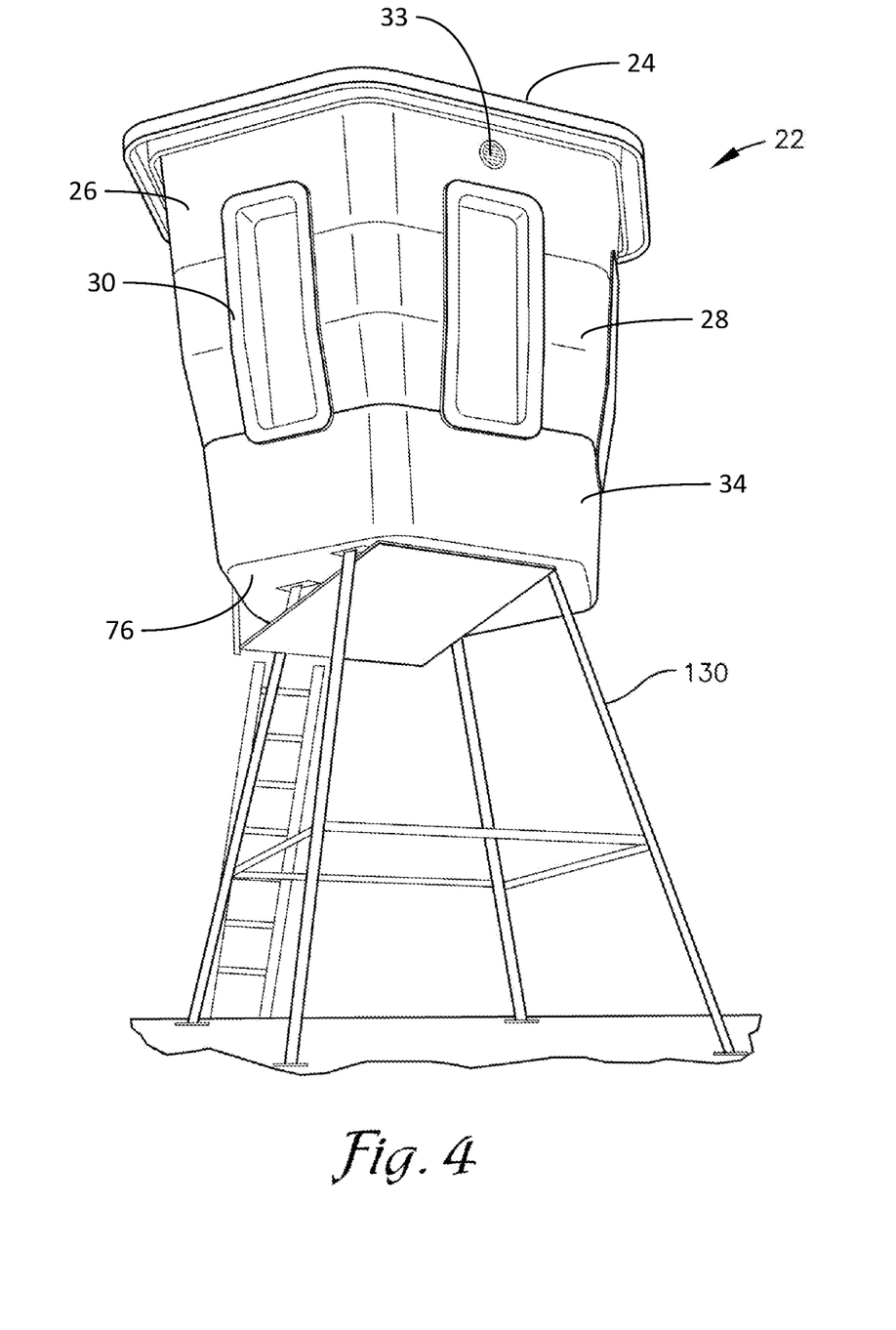
FIG. 4 is a perspective view of the hunting blind of FIG. 1 on a raised platform.
Figure 10:
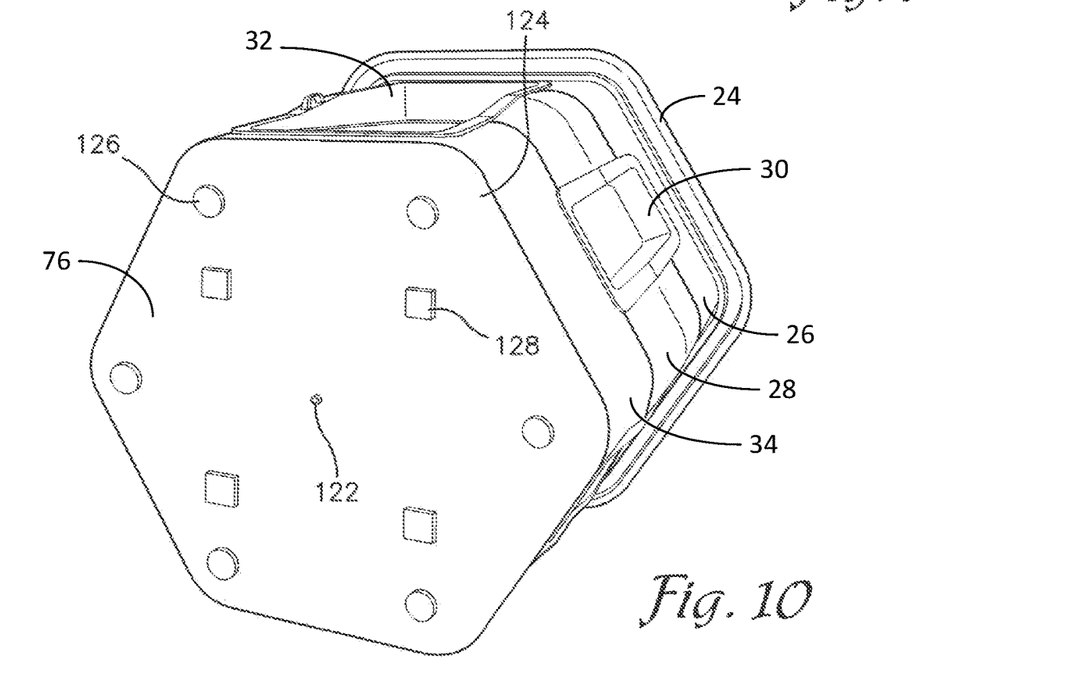
FIG. 10 is a bottom view of the hunting blind of FIG. 1.
Figures 11, 12, 13:
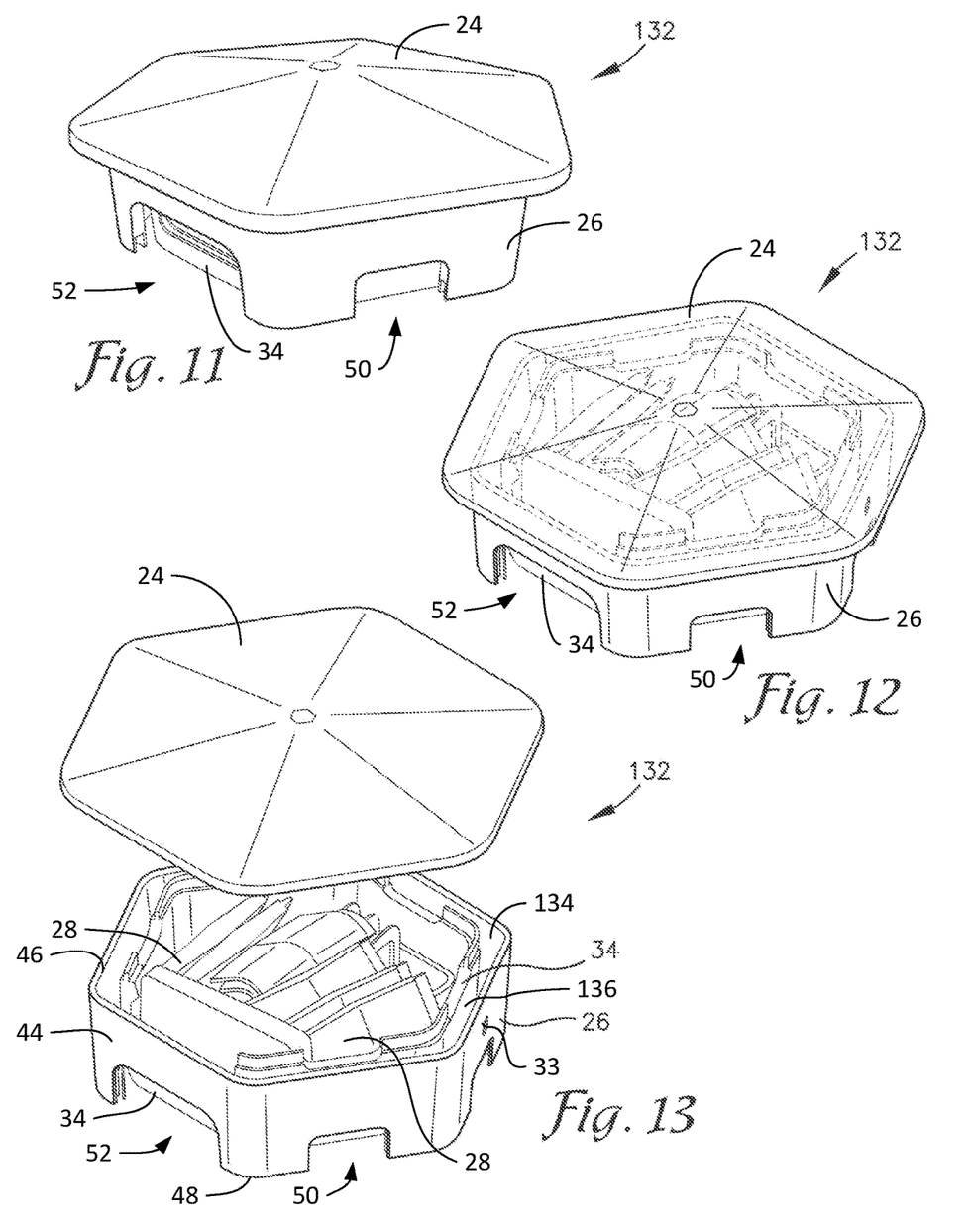
FIG. 11 is a perspective stored view of the hunting blind of FIG. 1.
FIG. 12 is a perspective stored view of the hunting blind of FIG. 1 shown with the top transparent to show the stored blind panels.
FIG. 13 is a perspective stored view of the hunting blind of FIG. 1 shown with the top raised to show the blind panels stored.
Figure 14:
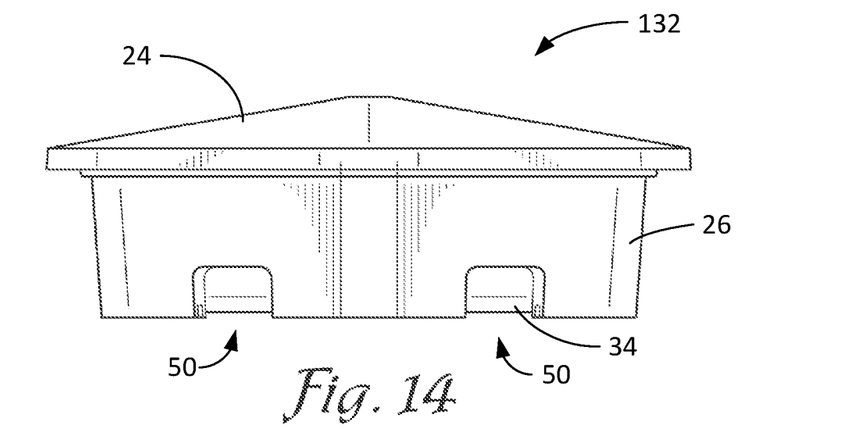
FIG. 14 is a side elevational view of the top and base of the hunting blind of FIG. 1 in the stored configuration.
Figure 15:
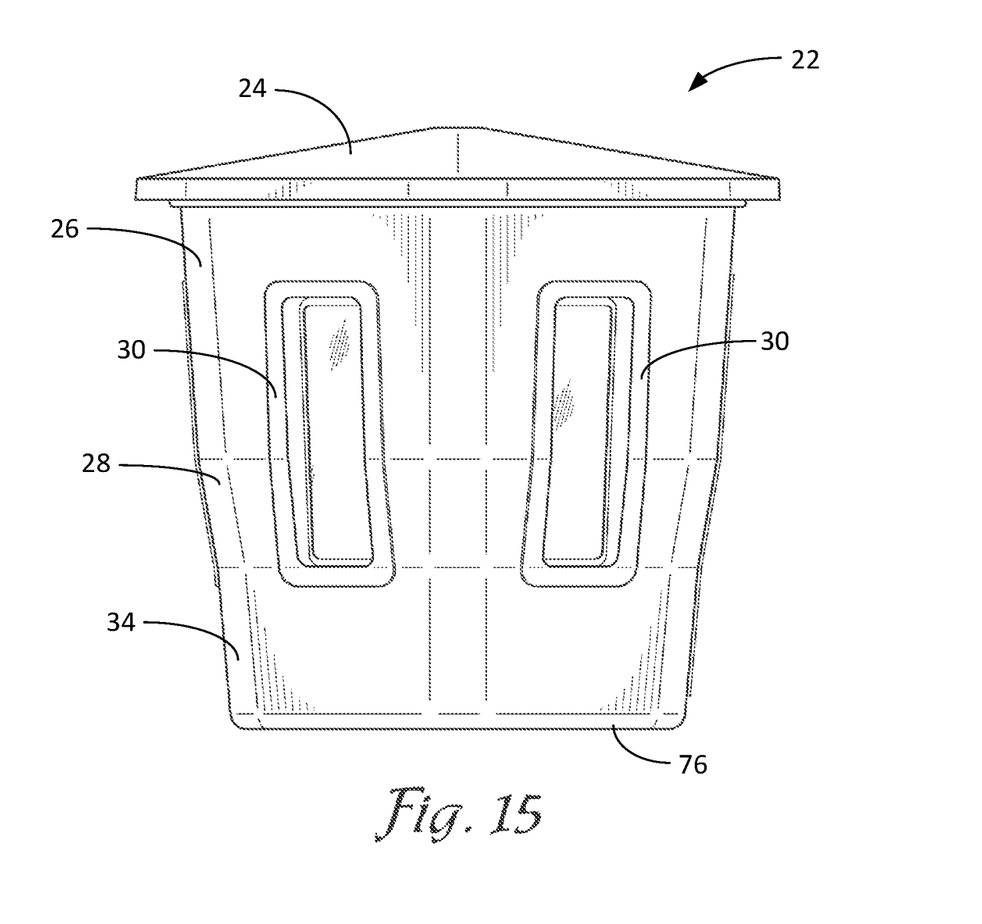
FIG. 15 is a side elevational view of the hunting blind of FIG. 1.

The floor 76 slopes from the outer periphery 114 to the center 116 and includes channels 118. The center 116 includes a drain 120 with a removable plug 122 to allow liquid to drain. The bottom exterior surface 124 of the floor 76 includes raised feet 126 for when the hunting blind 22 is placed on the ground and raised pads 128 for registering the hunting blind 22 with a tower framing 130. The raised pads 128 ensure that the hunting blind 22 locks into the tower framing 130 and provides a balanced structure that is stable.

All of the components of the hunting blind 22 may be arranged in a stored configuration 132 for shipping and storage. In the stored configuration 132, the door assembly 32 is placed flat on the floor 76 of the base section 34 and all of the wall sections 28 and window assemblies 30 are arranged within the base section 34. An inner periphery 134 of the top section 26 fits over an outer periphery 136 of the base section 34 to completely enclose the base section 34. The roof 24 is placed on the top section 26 to cover and protect the components of the hunting blind 22.

The hunting blind 22 is easy to setup by two persons with minimal hardware and tools. The wall sections are angled out at the top relative to the base at a two-to-fifteen-degree angle, and preferably a five-degree angle, for example, which allow for ease of bow hunting through the windows 92. The exterior surfaces shed water and protect against environmental conditions. Preferably, the components are fabricated from roto molded plastic to be lighter, more durable, weather resistant and impact resistant. The walls are of a double wall design to help with reducing acoustics, odor and improve insulation.

The hunting blind of the present invention is modular with the individual components configured to be stored in the base with the roof serving as a container top to store and ship the blind. The components are readily assembled in the field for placement on the ground or on a stand or platform with minimal tools.

It is to be understood that while certain now preferred forms of this invention have been illustrated and described, it is not limited thereto except insofar as such limitations are included in the following claims.

Having thus described the invention, what is claimed as new and desired to be secured by Letters Patent is:

1. A hunting blind comprising:
   a base having a floor and four walls extending upwardly from said floor, four corner sidewalls between each of said four walls and an inner area;
   a top section having four walls extending downwardly corresponding to said four walls of said base, four corner sidewalls between each of said four walls, and an inner periphery;
   four middle sections having an upper edge adapted to engage a corresponding corner sidewall of said top section and a bottom edge adapted to engage a corresponding corner sidewall of said base;
   a door assembly, a jamb, a flange, a door, and hinges attaching said door to said jamb, said flange adapted to secure said door assembly to two adjacent middle sections, said base and said top section; and
   a roof;
   whereas said hunting blind presents a stored configuration wherein said four middle sections and door assembly are stored within said inner area of said base and said top section surrounds said base, and said roof fits over said top section.

2. The hunting blind of claim 1 further comprising a window assembly wherein said window assembly is stored within said inner area of said base when said hunting blind is in said stored configuration.

3. The hunting blind of claim 1 further comprising three window assemblies wherein said three window assemblies are stored within said inner area of said base when said hunting blind is in said stored configuration.

4. A hunting blind comprising:
a base having a floor and six walls extending upwardly from said floor, six corner sidewalls between each of said six walls and an inner area;
a top section having six walls extending downwardly corresponding to said six walls of said base, six corner sidewalls between each of said six walls, and an inner periphery;
six middle sections having an upper edge adapted to engage a corresponding corner sidewall of said top section and a bottom edge adapted to engage a corresponding corner sidewall of said base;
a door assembly, a jamb, a flange, a door, and hinges attaching said door to said jamb, said flange adapted to secure said door assembly to two adjacent middle sections, said base and said top section; and
a roof;
whereas said hunting blind presents a stored configuration wherein said six middle sections and door assembly are stored within said inner area of said base and said top section surrounds said base, and said roof fits over said top section.

5. The hunting blind of claim 4 further comprising a window assembly wherein said window assembly is stored within said inner area of said base when said hunting blind is in said stored configuration.

6. The hunting blind of claim 4 further comprising a plurality of window assemblies wherein said plurality of window assemblies are stored within said inner area of said base when said hunting blind is in said stored configuration.

7. A hunting blind comprising:
a base having a floor and six walls extending upwardly from said floor, six corner sidewalls between each of said six walls and an inner area;
a top section having six walls extending downwardly corresponding to said six walls of said base, six corner sidewalls between each of said six walls, and an inner periphery;
six middle sections having an upper edge adapted to engage a corresponding corner sidewall of said top section and a bottom edge adapted to engage a corresponding corner sidewall of said base;
a door assembly, a jamb, a flange, a door, and hinges attaching said door to said jamb, said flange adapted to secure said door assembly to two adjacent middle sections, said base and said top section; and
a roof;
whereas said hunting blind presents a stored configuration wherein said six middle sections and door assembly are stored within said inner area of said base and said top section surrounds said base, and said roof fits over said top section;
whereas said hunting blind presents an assembled configuration wherein said bottom edges of six middle sections are fastened to said six corner sidewalls of said base, said six corner sidewalls of said top section are fastened to said upper edge of said six middle sections, said roof is fastened to said top section, and said flange of said door assembly is fastened to two adjacent middle sections.

8. The hunting blind of claim 7 further comprising a window assembly wherein said window assembly is stored within said inner area of said base when said hunting blind is in said stored configuration.

9. The hunting blind of claim 7 further comprising a plurality of window assemblies wherein said plurality of window assemblies are stored within said inner area of said base when said hunting blind is in said stored configuration.

10. The hunting blind of claim 7 further comprising a window assembly wherein said window assembly is fastened between two adjacent middle sections when said hunting blind is in said assembled configuration.

11. The hunting blind of claim 7 wherein said floor includes a drain.

* * * * *

UNITED STATES PATENT AND TRADEMARK OFFICE
CERTIFICATE OF CORRECTION

| | |
|---|---|
| PATENT NO. | : 11,638,420 B2 |
| APPLICATION NO. | : 17/116886 |
| DATED | : May 2, 2023 |
| INVENTOR(S) | : Brett A. Younie |

It is certified that error appears in the above-identified patent and that said Letters Patent is hereby corrected as shown below:

In the Specification

In Column 1, Line 49, delete the second occurrence of "of a".

Signed and Sealed this
Twentieth Day of June, 2023

Katherine Kelly Vidal
*Director of the United States Patent and Trademark Office*